(12) United States Patent
Huber et al.

(10) Patent No.: US 8,256,602 B2
(45) Date of Patent: Sep. 4, 2012

(54) ROLLER CONVEYOR

(75) Inventors: Thomas Huber, Schliersee (DE); Richard Holzner, Stephanskirchen (DE)

(73) Assignee: Telair International GmbH (DE)

( * ) Notice: Subject to any disclaimer, the term of this patent is extended or adjusted under 35 U.S.C. 154(b) by 141 days.

(21) Appl. No.: 12/721,473

(22) Filed: Mar. 10, 2010

(65) Prior Publication Data

US 2010/0230230 A1 Sep. 16, 2010

(30) Foreign Application Priority Data

Mar. 10, 2009 (DE) .................. 10 2009 012 427

(51) Int. Cl.
*B65G 39/02* (2006.01)

(52) U.S. Cl. .................. 193/35 R; 193/35 A; 193/35 SS

(58) Field of Classification Search ................ 193/35 R, 193/35 A, 35 SS; 198/860.1, 861.1
See application file for complete search history.

(56) References Cited

U.S. PATENT DOCUMENTS

| | | | | |
|---|---|---|---|---|
| 1,826,832 A * | 10/1931 | Lee | ................. | 198/448 |
| 3,023,487 A * | 3/1962 | Hinckley | ................. | 29/438 |
| 3,778,012 A * | 12/1973 | Fernandez | ................. | 410/69 |
| 3,869,031 A * | 3/1975 | Coleman et al. | ................. | 193/35 R |
| 3,915,275 A * | 10/1975 | Specht | ................. | 193/35 R |
| 4,081,157 A * | 3/1978 | Petry | ................. | 244/137.1 |
| 4,182,440 A * | 1/1980 | Juergens | ................. | 193/35 A |
| 4,186,830 A * | 2/1980 | Corey et al. | ................. | 193/35 R |
| 4,205,740 A * | 6/1980 | Hammond | ................. | 193/35 A |
| 4,239,100 A * | 12/1980 | Corey | ................. | 193/35 R |
| 4,347,923 A * | 9/1982 | Wong | ................. | 193/35 S |
| 4,541,518 A * | 9/1985 | Palazzolo et al. | ................. | 193/35 A |
| 4,681,203 A * | 7/1987 | Kornylak | ................. | 193/35 R |
| 5,915,515 A * | 6/1999 | Blair | ................. | 193/35 SS |
| 6,051,133 A * | 4/2000 | Huber et al. | ................. | 210/171 |
| 6,230,908 B1 * | 5/2001 | Sloan et al. | ................. | 211/151 |
| 6,413,029 B1 * | 7/2002 | Kernkamp | ................. | 410/79 |
| 6,422,372 B2 * | 7/2002 | Ransil | ................. | 193/35 SS |
| 6,490,983 B1 * | 12/2002 | Nicholson et al. | ................. | 108/106 |
| 7,086,517 B2 * | 8/2006 | Clos et al. | ................. | 193/35 R |
| 7,506,741 B2 * | 3/2009 | Yagi et al. | ................. | 193/35 R |
| 7,731,460 B2 * | 6/2010 | Brown et al. | ................. | 410/77 |
| 7,758,290 B2 * | 7/2010 | Boggenstall et al. | ................. | 410/80 |
| 7,988,391 B2 * | 8/2011 | Schulze | ................. | 410/80 |

FOREIGN PATENT DOCUMENTS

| | | |
|---|---|---|
| DE | 195 01 562 A1 | 7/1996 |
| DE | 10 2004 016 219 B3 | 10/2005 |
| DE | 10 2006 060 785 A1 | 7/2008 |
| EP | 1 935 782 A1 | 6/2008 |

OTHER PUBLICATIONS

Extended European Search Report dated Nov. 24, 2010.

\* cited by examiner

*Primary Examiner* — Douglas Hess

(74) *Attorney, Agent, or Firm* — Barnes & Thornburg LLP

(57) ABSTRACT

Roller conveyors of an aircraft cargo deck, including rollers for transporting freight packages, particularly containers, and a channel with side walls and a base for the installation of locking bar elements to hold the freight packages, are provided. The side walls have reinforcing sections with recesses in which the rollers are installed, whereby axles on which the rollers are rotatably mounted are fixed in each of the side walls. This results in an extremely sturdy but nevertheless lightweight construction.

8 Claims, 2 Drawing Sheets

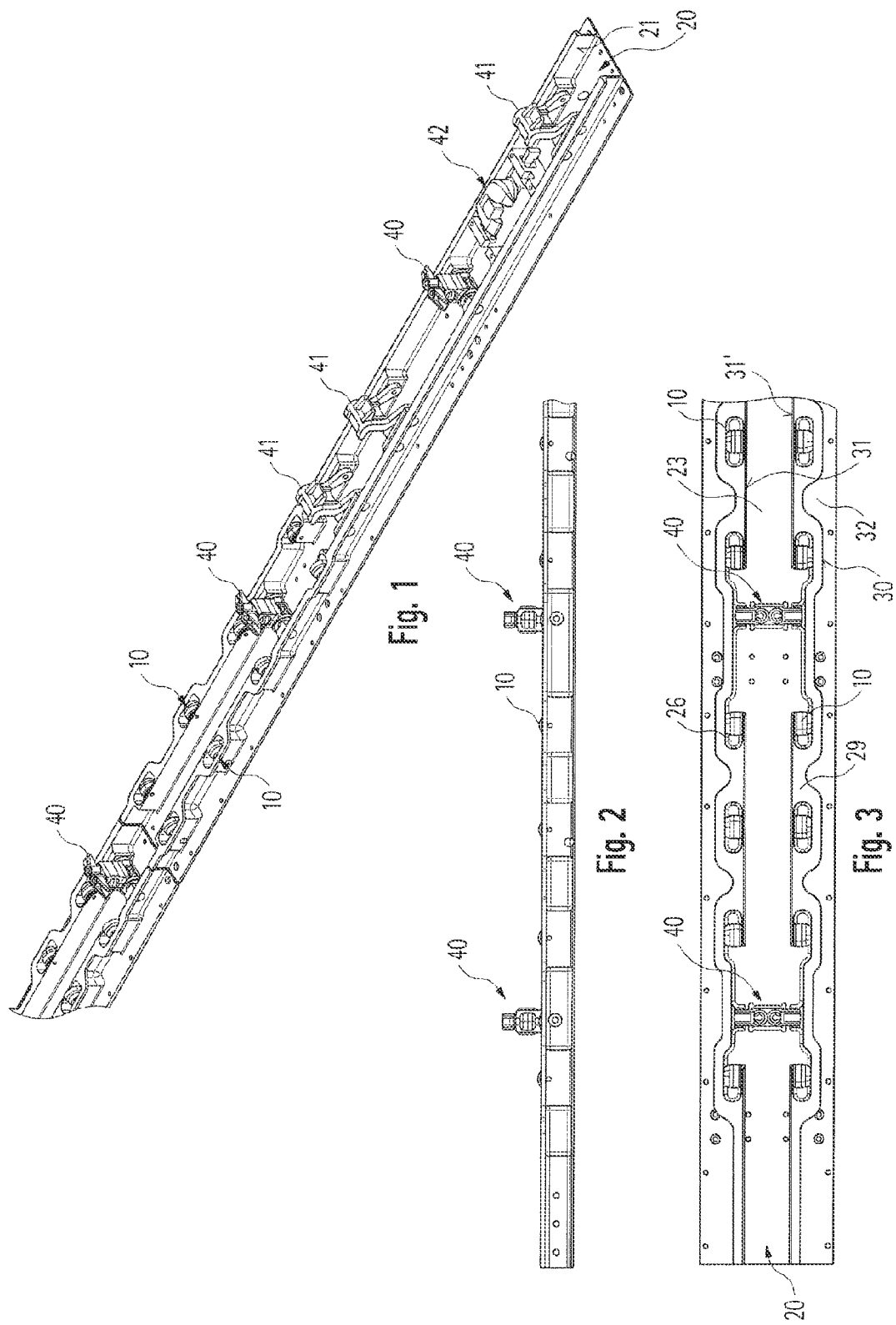

ROLLER CONVEYOR

CROSS-REFERENCE TO RELATED APPLICATIONS

This application claims priority to foreign Patent Application No. DE 10 2009 012 427.6, filed on Mar. 10, 2009, the disclosure of which is incorporated herein by reference in its entirety.

FIELD OF THE INVENTION

The present invention relates to a roller conveyor of an aircraft cargo deck.

BACKGROUND OF THE INVENTION

A cargo deck of an aircraft usually has roller conveyors on which items of freight, particularly containers, can be moved particularly in the aircraft's longitudinal direction. The containers then also stand on these roller conveyors during the flight, where locking bars that engage with (standardized) sections of the containers are normally provided.

A significant problem with such roller conveyors is that on one hand high stability and ruggedness must be met, as operation frequently takes place under difficult conditions and nevertheless has to run smoothly, while on the other the weight of such roller conveyors represents a significant problem. Finally, there is also a problem in that the loading possibilities must be highly variable. In order to guarantee this, it must be possible to travel over the roller conveyors, and particularly the roller conveyors installed centrally in the aircraft's cargo hold, with them lying centrally under a container as necessary, and in the case of other container dimensions with them functioning on only the peripheral sides under a container thus supporting it.

SUMMARY OF THE INVENTION

Embodiments of the present invention advantageously provide a roller conveyor of the type referred to at the outset to the effect that high variability is ensured with high stability and low weight.

In one embodiment, a roller conveyor of an aircraft cargo deck includes rollers for transporting freight packages, particularly containers, and a channel with side walls and a base for the installation of locking bar elements to hold the freight packages. The side walls have reinforcing sections with recesses in which the rollers are installed in such a way that axles on which the rollers are rotatably mounted are fixed in each of the side walls.

Extremely high stability is ensured due to the fact that the side walls have said reinforcing sections and the rollers are mounted in the recesses provided therein. On the other hand, due to the rollers being mounted in positions on the far edge, it is also possible to support containers on their peripheral sections as is the case.

Preferably, the side walls are finished on their upper edges by top surfaces with overhanging outer edges. The result is increased stability and bending resistance in a direction transverse to the roller conveyor. This additionally ensures that the roller conveyors can also be walked on.

The top surfaces are preferably designed to finish flush with inner surfaces of the side walls. Thus the roller conveyor's channel is easily accessible for the installation of other functional elements, e.g. roller drive units or locking bars.

The outer edges are designed to run substantially in line with the contours of the side walls. Thus the width of the overhanging top surfaces is substantially constant over the roller conveyor's length such that the necessary stability is guaranteed at all points while superfluous weight is avoided.

Preferably, locking bars are installed between the side walls in close proximity to the rollers. This proximity of the locking bars to the rollers ensures that a container immobilized by means of the locking bar is optimally supported and therefore the locking bar cannot come loose. In this case the recesses are open towards the locking bars on one side thus creating maximum space so that the locking bars can be moved to enable them to be rolled over.

BRIEF DESCRIPTION OF THE DRAWINGS

The invention will be explained in greater detail in the following on the basis of an exemplary embodiment that will be described on the basis of drawings.

FIG. 1 is a perspective view of two adjacent roller conveyors.

FIG. 2 is a lateral view of the roller conveyor according to FIG. 1.

FIG. 3 is a view from above onto the roller conveyor according to FIG. 2.

DETAILED DESCRIPTION

Figure 4:
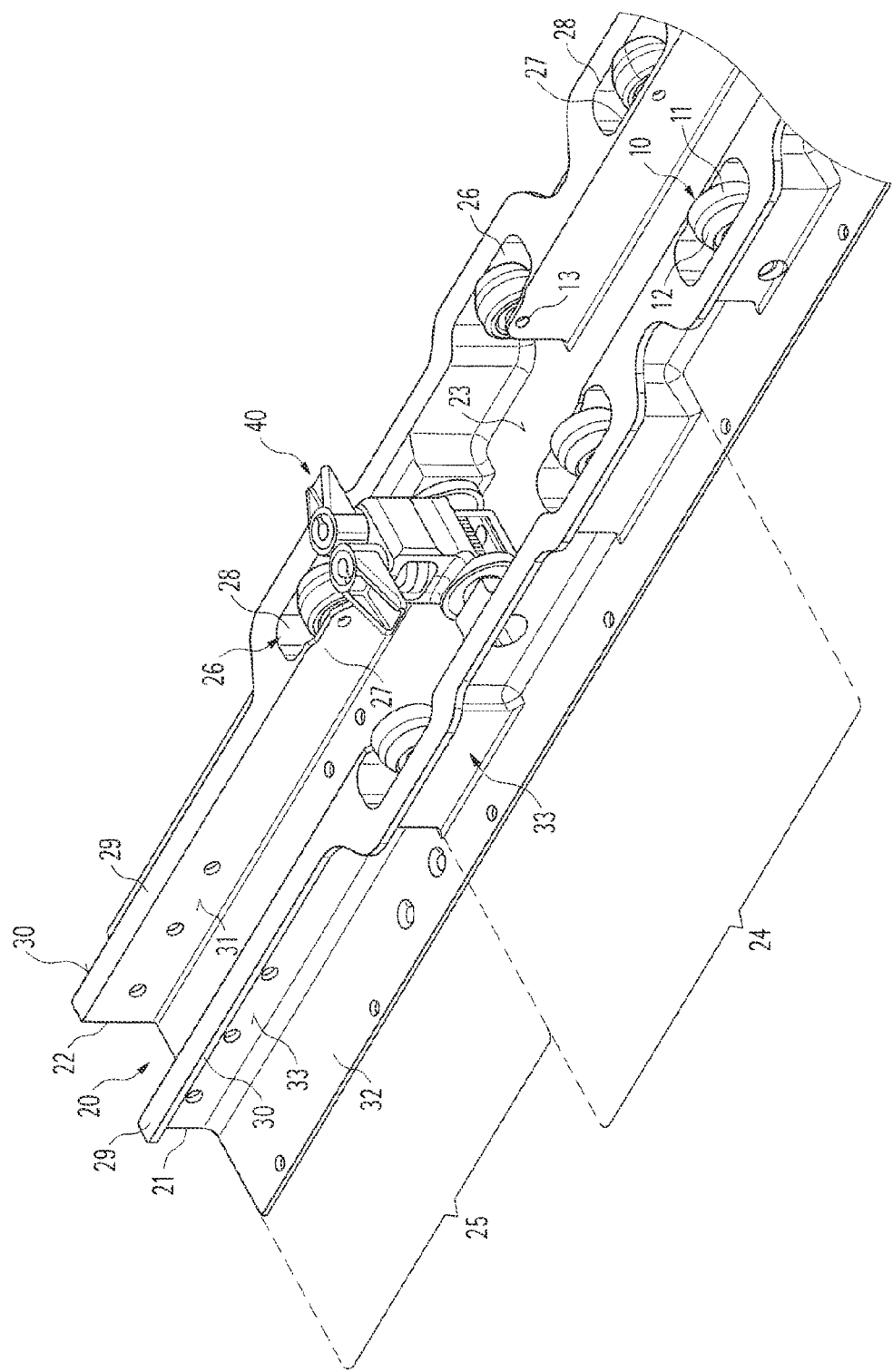
FIG. 4 is an enlarged diagram of a portion of the roller conveyor according to FIG. 1.

The invention will now be described with reference to the drawing figures, in which like reference numerals refer to like parts throughout.

As is apparent from the drawings, the roller conveyor illustrated here comprises a channel 20 which is formed by side walls 21, 22 and a base 23. Base 23 continues outwards into an installation plate 32 which runs on both sides of the roller conveyor.

Side walls 21, 22 have reinforcing sections 24 which, compared to normal sections 25, have protruding outer walls 33 whilst inner surfaces 31, 31' (see FIG. 3) run substantially continuously. Provided in these reinforcing sections 24 are recesses 26 in which rollers 10 are mounted. Here rollers 10 are rotatably mounted on axles 13 which are fixed with their ends in an inner section 27 and an outer section 28 (see FIG. 4) of side walls 21, 22. Rollers 10 have carrier regions 11 which run parallel to axle 13 and approach regions 12 which taper outwards starting from carrier regions 11 such that approaching rollers 10 from the side with a container lifts this container onto carrier region 11.

Side walls 21, 22 merge at their upper edges into top surfaces 29 which protrude outwards seen from channel 20 and have outer edges 30 which substantially follow the outline of side walls 21, 22. Thus, in the region of reinforcing sections 24, outer edges 30 protrude further than in the region of normal sections 25.

In addition to rollers 10, y-z locking bars 40 and x-z locking bars 41 are installed in channel 20; y-z locking bar 40 illustrated in FIG. 4 is installed in a region of channel 20 where inner surfaces 31 of side walls 21, 22 leave an enlarged space. Installation of this locking bar is carried out here such that its axle is supported directly in side walls 21, 22. In the example illustrated in FIG. 4, rollers 10 are furthermore mounted as close as possible to locking bar 40 such that this guarantees support of the container held by locking bar 40 immediately in the region of said locking bar 40.

Furthermore, provided in FIG. 1 with reference number 42 is what is known as a splitter which acts as a guide element in order, in the case of a roller conveyor disposed centrally in the cargo hold, to push apart two containers running next to one another in such a manner that they can be held correctly by the y-z locking bar after positioning.

The roller conveyor illustrated here is preferably milled from an extruded section. Of course, other production methods are also possible.

The many features and advantages of the invention are apparent from the detailed specification, and, thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and, accordingly, all suitable modifications and equivalents may be resorted to that fall within the scope of the invention.

What is claimed is:

1. A roller conveyor of an aircraft cargo deck, comprising:
   rollers for transporting freight items, and
   an extruded channel with two side walls and a base connecting said side walls for installation of locking elements or other functional elements between said side walls for holding, guiding and transporting freight items,
   wherein each of said two side walls has reinforcing sections with recesses, each reinforcing section having a protruding outer wall and an inner surface that runs substantially continuously, each said recess being located between said inner surface and said outer wall, wherein a roller is installed in each said recess such that the axle on which the roller is rotatably mounted is fixed in an inner section and an outer section of a side wall.

2. A roller conveyor according to claim 1, wherein the side walls are finished on their upper edges by top surfaces with overhanging outer edges.

3. A roller conveyor according to claim 2, wherein the top surfaces finish flush with inner surfaces of side walls.

4. A roller conveyor according to claim 3, wherein the outer edges are designed to run substantially in line with the contours of the side walls.

5. A roller conveyor according to claim 2, wherein the outer edges are designed to run substantially in line with the contours of the side walls.

6. A roller conveyor according to claim 1, wherein locking bars are installed between the side walls in close proximity to the rollers.

7. A roller conveyor according to claim 6, wherein the recesses are open towards the locking bars on the inside.

8. A roller conveyor according to claim 1, wherein the freight items are containers.

* * * * *